(12) United States Patent
Domen

(10) Patent No.: US 6,382,555 B1
(45) Date of Patent: May 7, 2002

(54) FIBER OPTICS ASSEMBLY

(75) Inventor: Stephen Domen, West Covina, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 04/391,075

(22) Filed: Aug. 19, 1964

(51) Int. Cl.$^7$ .................................................. F41G 7/26
(52) U.S. Cl. ........................................................ 244/3.16
(58) Field of Search ......................... 88/1 HVS, 1 LCR, 88/1 M; 102/50; 244/14, 3.16; 250/83.3, 227–233

(56) References Cited

U.S. PATENT DOCUMENTS

| | | | |
|---|---|---|---|
| 1,751,584 A | * | 3/1930 | Hansell |
| 2,122,750 A | * | 7/1938 | Nicolson |
| 2,354,591 A | * | 7/1944 | Goldsmith |
| 2,457,981 A | * | 1/1949 | Forest |
| 2,668,869 A | * | 2/1954 | Iams |
| 2,755,390 A | * | 7/1956 | Teichmann |
| 2,759,602 A | * | 8/1956 | Baigert |
| 2,911,167 A | * | 11/1959 | Null et al. |
| 2,942,118 A | * | 6/1960 | Gedance |
| 2,992,587 A | * | 7/1961 | Hicks, Jr. et al. |
| 3,001,437 A | * | 9/1961 | Taylor |
| 3,007,053 A | * | 10/1961 | Merlen |
| 3,010,677 A | * | 11/1961 | Guthrie et al. |
| 3,036,153 A | * | 5/1962 | Day |
| 3,043,910 A | * | 7/1962 | Hicks, Jr. |

* cited by examiner

*Primary Examiner*—Charles T. Jordan
(74) *Attorney, Agent, or Firm*—Andrew J. Rudd; Glenn H. Lenzen, Jr.; Colin M. Raufer

(57) ABSTRACT

A control system for a rolling missile that has a seeker head including an optical system and a heat detector assembly. The optical system including a primary reflector, a secondary reflector, a reticle/lens assembly, and a fiber optics assembly operatively associated with the reticle/lens assembly. The fiber optics assembly is constructed so as to translate images appearing near the optical axis of the optical system to a radially displaced point on the reticle/lens assembly to provide a more efficient chopping of the image by the reticle/lens assembly thus providing continuous pulses to the heat sensitive detector assembly.

17 Claims, 2 Drawing Sheets

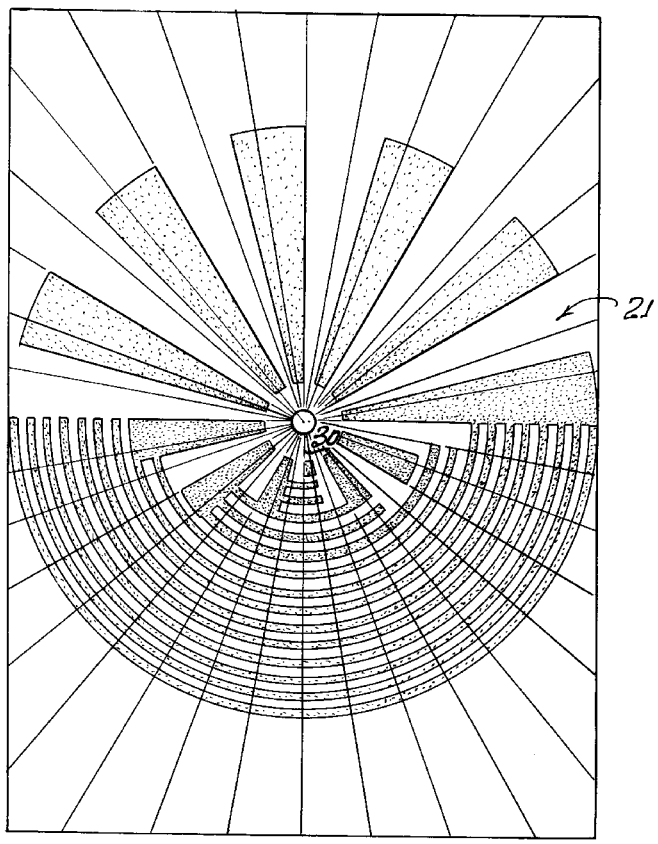
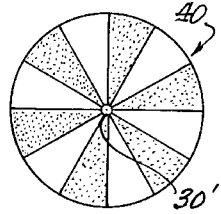
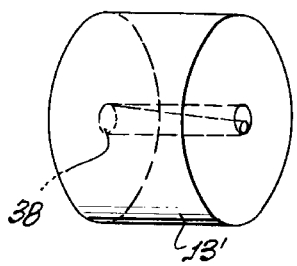
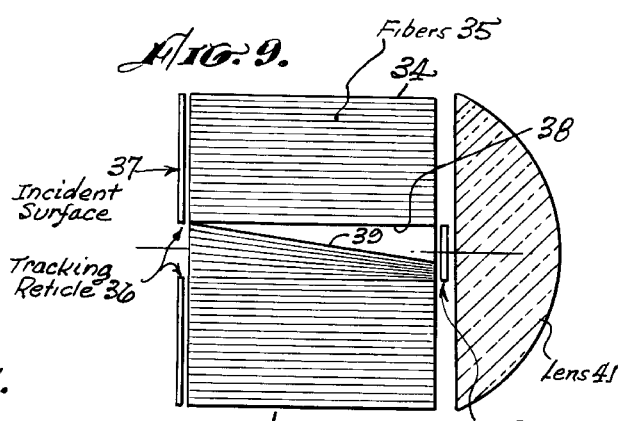
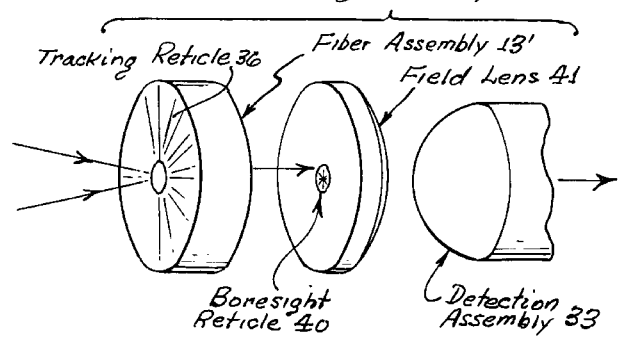

FIBER OPTICS ASSEMBLY

This invention relates to control systems, particularly to missile control systems, and more particularly to missile control systems utilizing fiber optics in the seeker head thereof.

In missiles, especially in rolling type missiles which utilize a free gyro stabilized heat sensing mechanism for controlling wing surfaces of either the variable area or variable incidence type, one of the greatest problems is in providing an efficient control system therefor. As illustrated in FIG. 2 of U. S. Pat. No. 3,010,677, an infrared seeker head is used to provide a measurement of angular rate of the missile-to-target line of sight. The entire optical unit is a part of a rotating gyro mass or rotor. As illustrated in the above cited patent, the optical portion of the head is a Cassegrain telescope wherein incident energy is reflected by the gyro-mounted primary mirror onto a secondary mirror and focused onto a spinning reticle or chopper. Light passing through the reticle falls on an infrared cell which converts heat energy pulses to electrical pulses, the cell being stationary with respect to the telescope.

The reticle serves two functions in an infrared seeker: It provides discrimination against certain unwanted targets such as cloud edges and it permits sensing of tracking error by chopping the radiation passing to the sensitive cell.

One problem of the prior known control systems utilizing a free gyro stabilized heat sensing mechanism having a rotating reticle system is that the reticle chopping efficiency approaches zero as the target image approaches boresight. Because of this effect, automatic gain control (AGC) information cannot be derived whereby seeker loop gain can be effectively controlled.

This invention provides a means of overcoming the above problem by placing a fiber optical element in association with the reticle for translation of an image to a more favorable reticle radius to effect efficient chopping.

Therefore, it is an object of this invention to provide a control system.

A further object of the invention is to provide a control system for rolling missiles.

Another object of the invention is to provide a control system for rolling missiles or the like utilizing a free gyro-stabilized heat sensing mechanism incorporating a spinning reticle or chopper.

Another object of the invention is to provide a control system for rolling missiles or the like utilizing a free gyro-stabilized heat sensing mechanism incorporating fiber optics in cooperation with spinning and fixed reticles.

Another object of the invention is to provide a light energy chopping mechanism with fiber optics for translation of an image to a more favorable chopper radius to effect efficient chopping.

Other objects of the invention not specifically set forth above will become readily apparent from the following description and accompanying drawings wherein:

FIG. 5 is a view of a simplified reticle pattern;

FIG. 7 is an enlarged exploded view of the FIG. 6 embodiment;

FIG. 8 is a schematic view of the FIG. 6 embodiment of the invention;

FIG. 9 is an enlarged view of the FIG. 6 embodiment; and

FIG. 10 is a view of the boresight reticle pattern.

Figure 1:
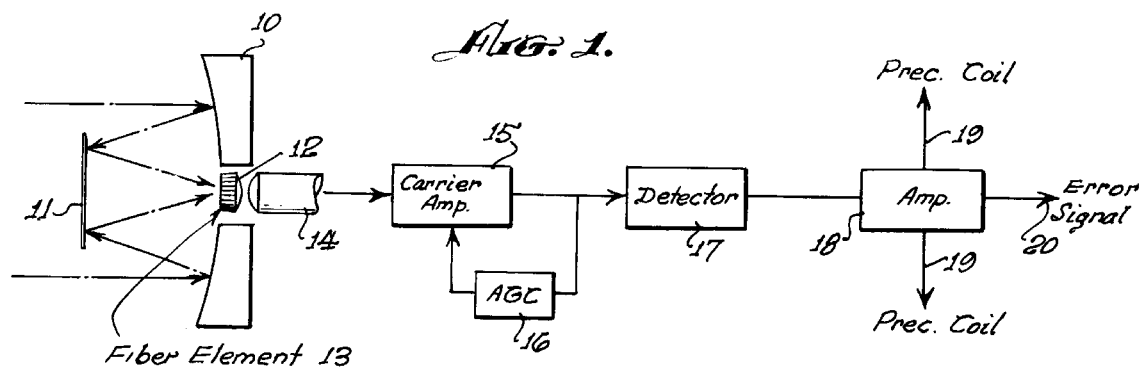
FIG. 1 is a schematic view of a portion of a control system utilizing an embodiment of the invention.

The invention broadly relates to the provision, in an infrared seeker head, of a fiber optical element at the focal plane of a Cassegrain mirror system immediately in front of and rotating with a scanner reticle, or between a rotating tracking reticle and a fixed boresight reticle, in order to translate images appearing near the optical axis to a radially displaced point on the reticle where more efficient chopping of the image can occur.

Fiber optical assemblies operate on the principle of total internal reflection. Given a rod of glass having optically finished surfaces, a light ray entering one end of the rod will emerge at the other end of the rod with very little loss if certain conditions are met, namely:

1. The ray is incident on the interface (sides of the rod) from the higher index side, and if;
2. The angle the ray makes with the normal to the interface is greater than some critical angle dependent only on the indices of the materials. This angle is found from Snell's Law, or simply:

$$\sin\phi = \frac{n_2}{n_1}$$

where: $n_1$=the index of the rod (fiber) material $n_2$=the index of the surrounding material In practice the individual fibers are coated with a material having an index lower than that of the fiber; this is done for two reasons:

1. To reduce cross talk (light leakage) between the fibers; and
2. To protect the fibers from scratches and dirt whereby transmission would suffer. A coating thickness in the order of ¼ of the incident wavelength is generally used.

The resolution one can achieve with fibers is a function of the fiber diameter and detail smaller than this diameter will not be resolved. Optical fibers having a diameter of 4 microns (0.00015748 inches) are currently available and fibers as small as 2 microns (0.00007874 inches) have been made. However, fibers of 10 micron diameter are applicable to this approach. The 4 micron diameter fiber, for example, will give a resolution of:

$$W = \frac{1.22}{D}$$

where: D=fiber diameter $$W = \frac{1.22}{0.00015748} = 7750 \text{ lines/inch}$$

The transmission through the fiber bundle is a function of the fiber surface quality and the fiber length, and of course the absorption in the material. Transmission in the order of 98% is possible.

Not all the cross sectional area of the fiber bundle, however, can be used for transmission. The spacing between the fiber edges taken up by the coating etc., can not be used; this "space factor" can be calculated and it is important that this factor be high. This factor can be found using the following expression:

$$P = \frac{\pi}{3.464}\left(\frac{D}{D+d}\right)^2$$

where D=fiber diameter
and d=distance between fiber edges

The maximum space factor expected is obviously $$\frac{\pi}{3.464}$$

or approximately 0.9; with the coating about the fibers this factor is in the order of 0.8. Thus, the transmission of the fiber bundle is greatly dependent upon the space factor and a 20% loss through the fiber bundle can be expected due to area between the fibers not being used to transmit light.

Referring now to the embodiment shown in FIGS. 1–5, the fiber element of the invention is positioned at the focal plane of the optical system just prior to the reticle and rotates with the reticle; the rotating fiber bundle will have the effect of dynamic scanning giving increased resolution. In this embodiment of the invention the fibers are used merely to translate the target image causing the image to fall upon a point on the reticle where better chopping efficiency is possible; boresight rays diverted to a reticle radius of 0.0075 inches, for example.

As shown in FIG. 1, the seeker head of the control system includes a primary mirror 10 which passes incident energy to a secondary mirror 11, and then to a reticle/lens unit 12 through a fiber element 13. Light passing through the reticle falls on an infrared cell 14 which converts heat energy pulses to electrical pulses. The pulses from cell 14 are passed through a detector assembly which includes a carrier amplifier 15 which incorporates automatic gain control as indicated at 16, a detector 17, and an amplifier 18 which sends signals indicated at 19 of a predetermined frequency to the precession coils (indicated by legends) of the seeker head, and an error signal 20 to the control mechanism (not shown) for maintaining the missile-to-target line of sight.

The control mechanism may be of the variable area wing approach illustrated and claimed in the above mentioned patent or of the variable incidence, fixed area wing approach described and claimed in U. S. patent applications Ser. Nos. 395,112 filed Sep. 4, 1964 and 395,674 filed Sep. 16, 1964 entitled "Control System" and "Servosystem", respectively, and assigned to the same assignee.

Figure 2:
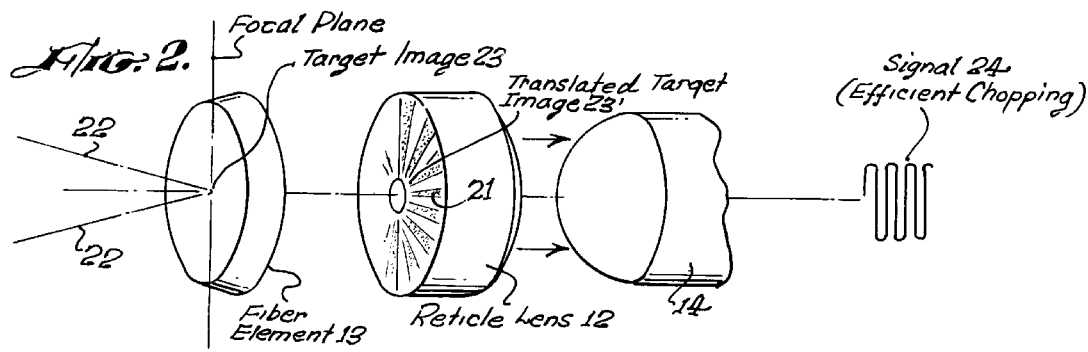
FIG. 2 is an enlarged exploded view of the FIG. 1 embodiment.

As shown in FIG. 2, in this embodiment of the invention the fibers of element 13 are used merely to translate the target image causing the image to fall upon a point on the reticle 21 of unit 12 where better chopping efficiency is possible; boresight rays being diverted to a reticle radius of 0.0075 inches, for example. Thus as energy rays indicated at 22 are reflected from secondary mirror 11 they impinge on fiber element 13 wherein the fibers of element 13 translate the target image 23 on the forward face of element 13 to the location on the reticle 21 of unit 12 as indicated at 23'. Boresight rays are diverted to an area on the reticle 21 which provides automatic gain control information at all times so that seeker loop gain can be effectively controlled by passing light through the reticle which falls on infrared cell 14 which passes electrical pulses having a sufficient chopping configuration as indicated at 24.

Figure 3:
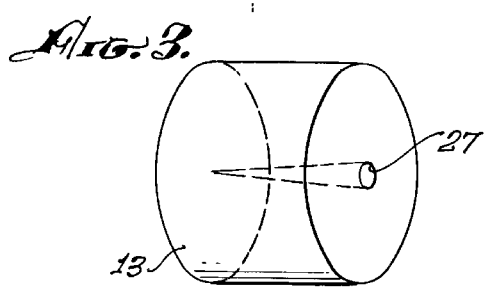
FIG. 3 is a schematic view of the FIG. 1 embodiment of the invention.
Figure 4:
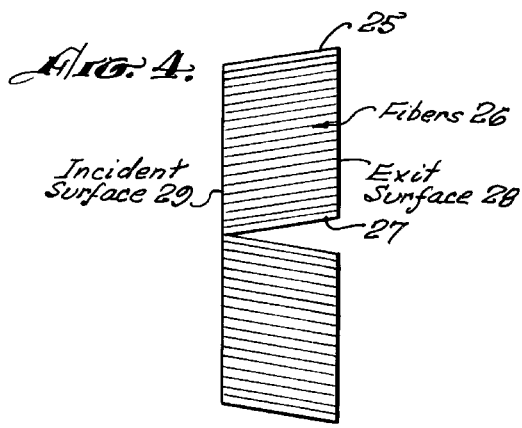
FIG. 4 is an enlarged view of the FIG. 3 embodiment.

As shown in FIGS. 3 and 4, the fiber element 13 is of a conical void configuration in the shape of a thin disc having a peripheral mounting ring (not shown), a frustrum 25 of optical fibers 26 and a small opaque axial cone 27 whose apex is directed away from the reticle. The length of the fibers 26 of element 13 can be quite small, the only requirement is that the length be many times the diameter of fibers 26; for example, with a 4 micron fiber a fiber length of 100 times the diameter or approximately 0.016 inch is sufficient.

It is thus obvious that the fiber element 13 is quite small in overall dimensions. For example, the length of the FIGS. 1–4 embodiment could be 0.100 inch ±0.002, the width 0.150 inch $$\begin{array}{c}+0.000\\-0.010\end{array},$$

and the cone width at the exit surface 28 being 0.015

$$\begin{array}{c}+0.010\\-0.000\end{array}$$

with the apex of the cone being at the incident surface 29 which as shown in FIG. 4 is of a smaller width of approximately 0.090 inch.

A simplified reticle pattern is shown in FIG. 5. An actual reticle pattern would have spiraled sectors. Notice that the central portion 30 of the pattern of reticle 21 is blank and chopping begins at an approximate 0.0075 inch radius; no light rays will impinge upon portion 30 of the reticle because of the action of fiber element 13. Also, the number of chopping sectors decreases with increasing reticle radius. This provides a carrier signal for AGC purposes and also provides for a varying amount of spin frequency static gain curve.

The embodiment of the invention illustrated in FIGS. 6–10 differs from the FIGS. 1–4 embodiment in that the fiber optical element is placed between rotating and non-rotating reticles. The functional purpose of this embodiment is for translation of the target boresight image to a more favorable reticle radius to effect efficient chopping.

As in the FIGS. 1–4 embodiment, not all of the light falling upon the fiber assembly will pass through the bundle because of the space factor, that is, the area between the fibers can not be used to transmit light, thus causing an approximate transmission loss of 20%. However, in this embodiment, this loss can be compensated for in the system by using the fibers to redirect the chopped light for more efficient collection by the detector lens.

In the FIGS. 6–10 embodiment, the fiber element of the invention is positioned at the focal plane of the optical system between a pair of reticles; the rotating fiber bundle will have the effect of dynamic scanning giving increased resolution, as in the FIGS. 1–4 embodiment. Again, in this embodiment, the fibers are used merely to translate the target image causing the image to fall upon a point on an AGC reticle where better chopping efficiency is possible; boresight rays diverted to a reticle radius of 0.0075 inches, for example.

Figure 6:
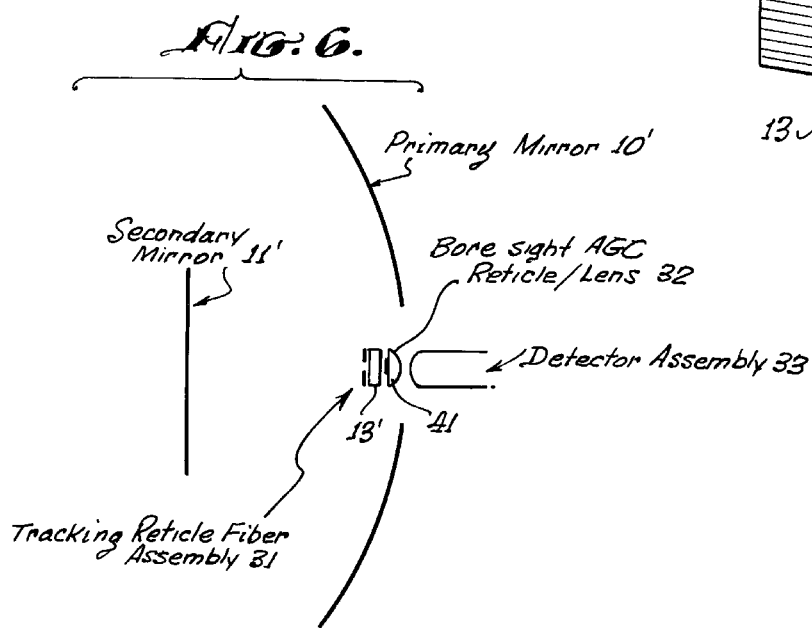
FIG. 6 is a schematic view of a portion of a control system utilizing a preferred embodiment of the invention.

As shown in FIG. 6, the seeker head includes a primary mirror 10' which passes incident energy to a secondary mirror 11', and then to a reticle assembly lens, comprising a tracking reticle fiber assembly 31 which spins with the gyroscope rotor and a boresight AGC reticle/lens unit 32 which does not spin with the gyro rotor, shown in detail in FIGS. 7, 8 and 9. Light passing through the reticle/lens assembly falls on an infrared cell of a detector assembly 33 which functions in essentially the same manner as the FIG. 1 assembly.

Referring now to FIGS. 7, 8 and 9, the fiber element 13' is of a tipped cone configuration in the shape of a disc 34 composed of a bundle of optical fibers 35 with a tracking reticle 36 positioned at the incident surface 37, disc 34 and reticle 36 being provided with a central bore 38. A bundle of fibers 39 having a tapering or tipped cone configuration are positioned within central bore 38 and have a boresight reticle 40 positioned at the exit surface of element 13'. Boresight reticle 40 is positioned in front of the lens 41 of unit 32. As in the FIGS. 1–4 embodiment, the fibers 35 and 39 have the same length to diameter relationship described above.

The tracking reticle 36 is blank in the center. The AGC or boresight reticle 40 is alternate opaque-transparent 15° chopping wedges around 360° of a 0.015 inch diameter area having a pattern illustrated in FIG. 10. The length and width of the FIGS. 6–10 embodiment, for example, could be of the same dimensions as the FIGS. 1–4 embodiment with the central bore 38 of element 13' being of the same dimension as the width of the exit of cone 27 of FIG. 3. The diameter of the tipped cone fiber bundle 39 at the incident surface 37 is approximately the same as the central bore 38 while the diameter at the exit surface is 0.005 inch ±0.001.

The simplified tracking reticle pattern of FIG. 5 also illustrates the operation of reticle 36 of the FIGS. 6–8 embodiment. Again, the central portion 30 of the reticle 36 is blank and chopping begins at an approximate 0.0075 inch radius; light falling in this center area is chopped by the boresight AGC reticle 40 which has a pattern shown simplified in FIG. 10 having a reduced diameter blank central portion 30'. Again, the number of chopping sectors decreases with increasing reticle radius. This provides a carrier signal for AGC purposes and also provides for a varying amount of spin frequency information as a function of pointing error, giving the desired slope to the static gain curve.

It has thus been shown that the fiber optics technique of this invention provides the capability of deriving AGC information in both the boresight and tracking areas, thus overcoming a major seeker problem.

While specific embodiments have been illustrated and described, modifications will become apparent to those skilled in the art, and it is intended to cover in the appended claims all such modifications as come within the spirit and scope of the invention.

What I claim is:

1. In a control system for rolling missiles or the like having a seeker head including an optical system and a heat sensitive detector assembly, said optical system including a primary reflecting means, a secondary reflecting means, a reticle/lens assembly, and a fiber optics assembly operatively associated with said reticle/lens assembly, said fiber optics assembly being constructed so as to translate images appearing near the optical axis of said optical system to a radially displaced point on said reticle/lens assembly, whereby more efficient chopping of the image by said reticle/lens assembly can be accomplished thus providing continuous pulses to said heat sensitive detector assembly.

2. The optical system defined in claim 1, wherein said reticle/lens assembly includes a light chopping means, and wherein said fiber optics assembly is positioned between said secondary reflecting means and said light chopping means.

3. The optical system defined in claim 1, wherein said reticle/lens assembly includes a pair of light chopping means, and wherein said fiber optics assembly is positioned between said pair of light chopping means.

4. In a control system for rolling missiles or the like having a seeker head including an optical system and a heat sensitive detector assembly; said optical system including a primary reflecting means, a secondary reflecting means, a reticle/lens assembly, and a fiber optics assembly operatively associated with said reticle/lens assembly, said reticle/lens assembly including a light chopping means, said fiber optics assembly being positioned between said secondary reflecting means and said light chopping means, said fiber optics assembly comprising a disc of optical fibers having an axial cone therein, said cone having an apex which is directed away from said light chopping means.

5. The optical system defined in claim 4, wherein said optical fibers have a diameter in the range between 2 and 10 microns.

6. In a control system for rolling missiles or the like having a seeker head including an optical system and a heat sensitive detector assembly; said optical system including a primary reflecting means, a secondary reflecting means, a reticle/lens assembly, and a fiber optics assembly operatively associated with said reticle/lens assembly, said reticle/lens assembly including a pair of light chopping means, said fiber optics assembly being positioned between said pair of light chopping means, said fiber optics assembly comprising a disc of optical fibers, said disc having a central bore therethrough, and a bundle of optical fibers having a tipped cone configuration positioned in said central bore.

7. The optical system defined in claim 6, wherein said optical fibers have a diameter in the range between 2 and 10 microns.

8. In an optical system, a fiber optics assembly comprising a disc of optical fibers having an opaque axial cone therein, said fibers being of substantially the same length and extending in a rearwardly diverging direction, said axial cone having an apex, said apex extending in a direction toward the incidence surface of said disc, said optical fibers having a diameter in the range between 2 and 10 microns.

9. In an optical system, a fiber optics assembly comprising a disc of optical fibers, said disc having a central bore therethrough, said fibers of said disc being of substantially the same length and positioned substantially parallel with respect to one another, and a bundle of optical fibers having a tipped cone configuration positioned in said central bore, said optical fibers having a diameter in the range between 2 and 10 microns.

10. In an optical system having a primary reflecting means, a secondary reflecting means, a reticle/lens assembly, and a detector assembly; a fiber optics assembly operatively associated with said reticle/lens assembly, said fiber optics assembly including optical fibers having a diameter in the range between 2 and 10 microns, said fiber optics assembly being constructed to translate images appearing near the optical axis to a radially displaced point on said reticle/lens assembly, whereby more efficient chopping of the image by said reticle/lens assembly can occur.

11. In an optical system having a primary reflecting means, a secondary reflecting means, a reticle/lens assembly, and a detector assembly; a fiber optics assembly operatively associated with the reticle/lens assembly, said fiber optics assembly including optical fibers having a diameter in the range between 2 and 10 microns, said optical fibers forming a disc-like member having an opaque axial cone with an apex directed toward the incidence surface of said disc-like member.

12. In an optical system having a primary reflecting means, a secondary reflecting means, a reticle/lens assembly, and a detector assembly; a fiber optics assembly operatively associated with the reticle/lens assembly, said fiber optics assembly including optical fibers having a diameter in the range between 2 and 10 microns, said optical fibers forming a disc-like member having a central bore extending therethrough, and a tipped cone configuration within said central bore of said disc-like member.

13. In a rolling missile having control means therefor including a heat sensitive seeker head which incorporates an optical system to pass incident energy to a detection assembly which converts the energy into electrical pulses which are utilized to control the missile, the improvement comprising a fiber optics assembly being constructed and operatively associated with the optical system to translate boresight images from said optical system to a radially displaced point on a chopping means of said detection system, whereby control pulses are continuously provided.

14. In a rolling missile having a control means therefor including a heat sensitive seeker head which incorporates an optical system to pass incident energy to a detection assembly which converts the energy into electrical pulses which are utilized to control the missile, the improvement comprising a fiber optics assembly operatively associated with the optical system to translate boresight images from said optical system to said detection system, said fiber optics assembly including a first bundle of optical fibers forming a disc-like member having a central bore, and a second bundle of optical fibers forming a tipped cone-like member and positioned in said central bore, whereby control pulses are continuously provided.

15. The fiber optics assembly defined in claim 14, wherein said optical fibers have a diameter in the range between 2 and 10 microns.

16. In a rolling missile having control means therefor including a heat sensitive seeker head which incorporates an optical system to pass incident energy to a detection assembly which converts the energy into electrical pulses which are utilized to control the missile, the improvement comprising a fiber optics assembly operatively associated with the optical system to translate boresight images from said optical system to said detection system, said fiber optics assembly including a bundle of optical fibers forming a disc-like member having an axial cone therein, said cone having an apex directed toward the incidence surface of said disc-like member, whereby control pulses are continuously provided.

17. The fiber optics assembly defined in claim 16, wherein said optical fibers have a diameter in the range between 2 and 10 microns.

* * * * *